Patented Jan. 31, 1928.

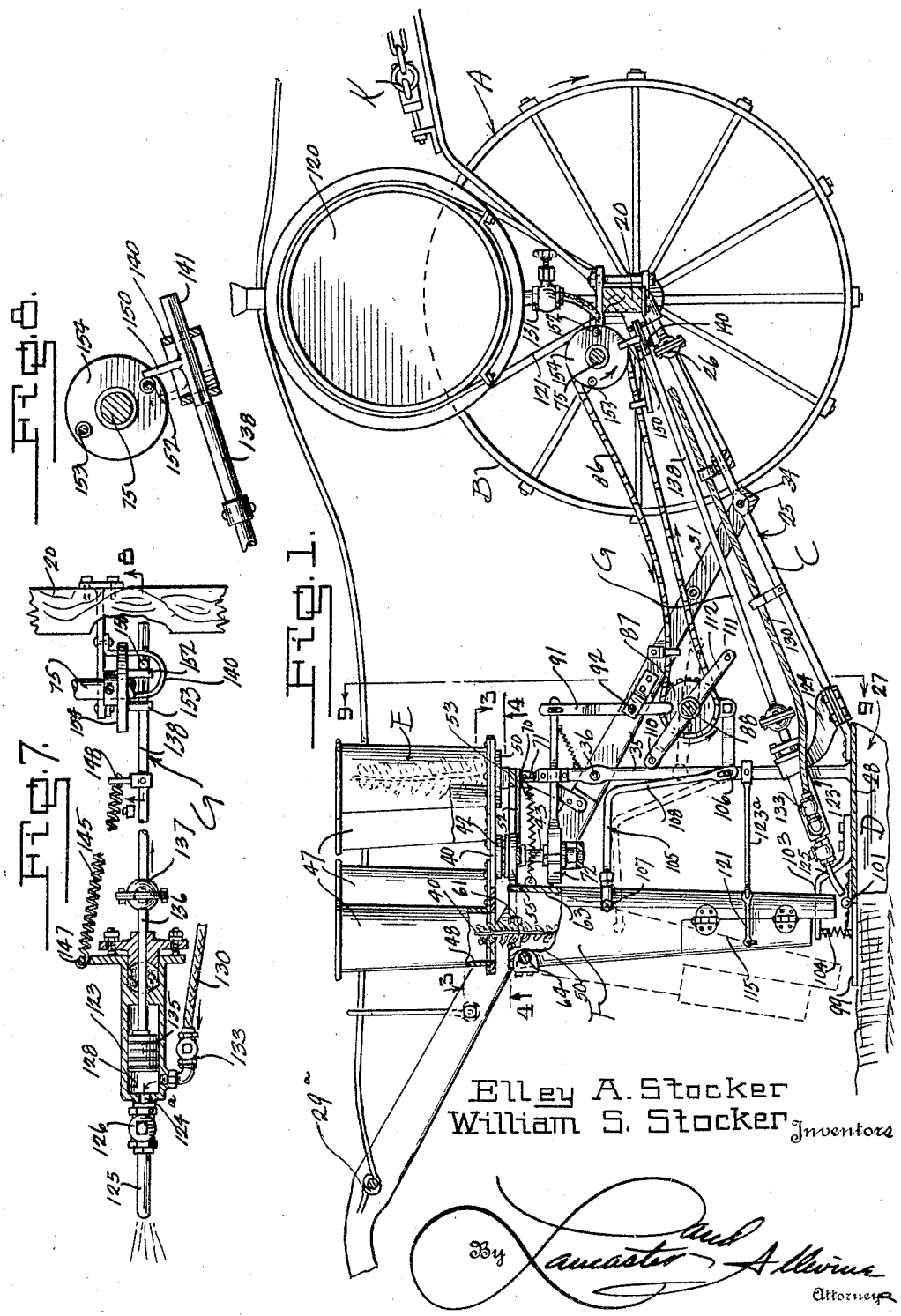

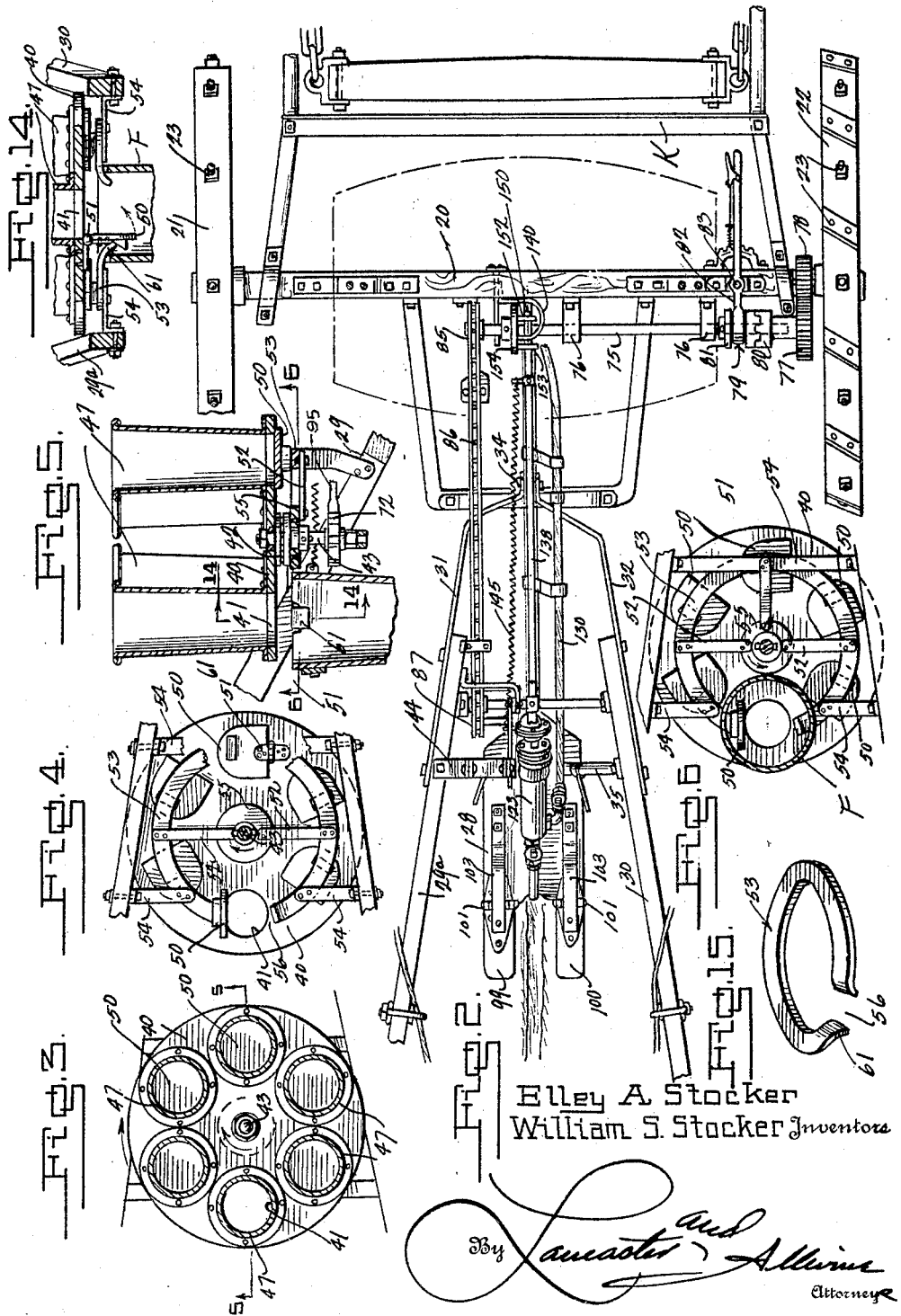

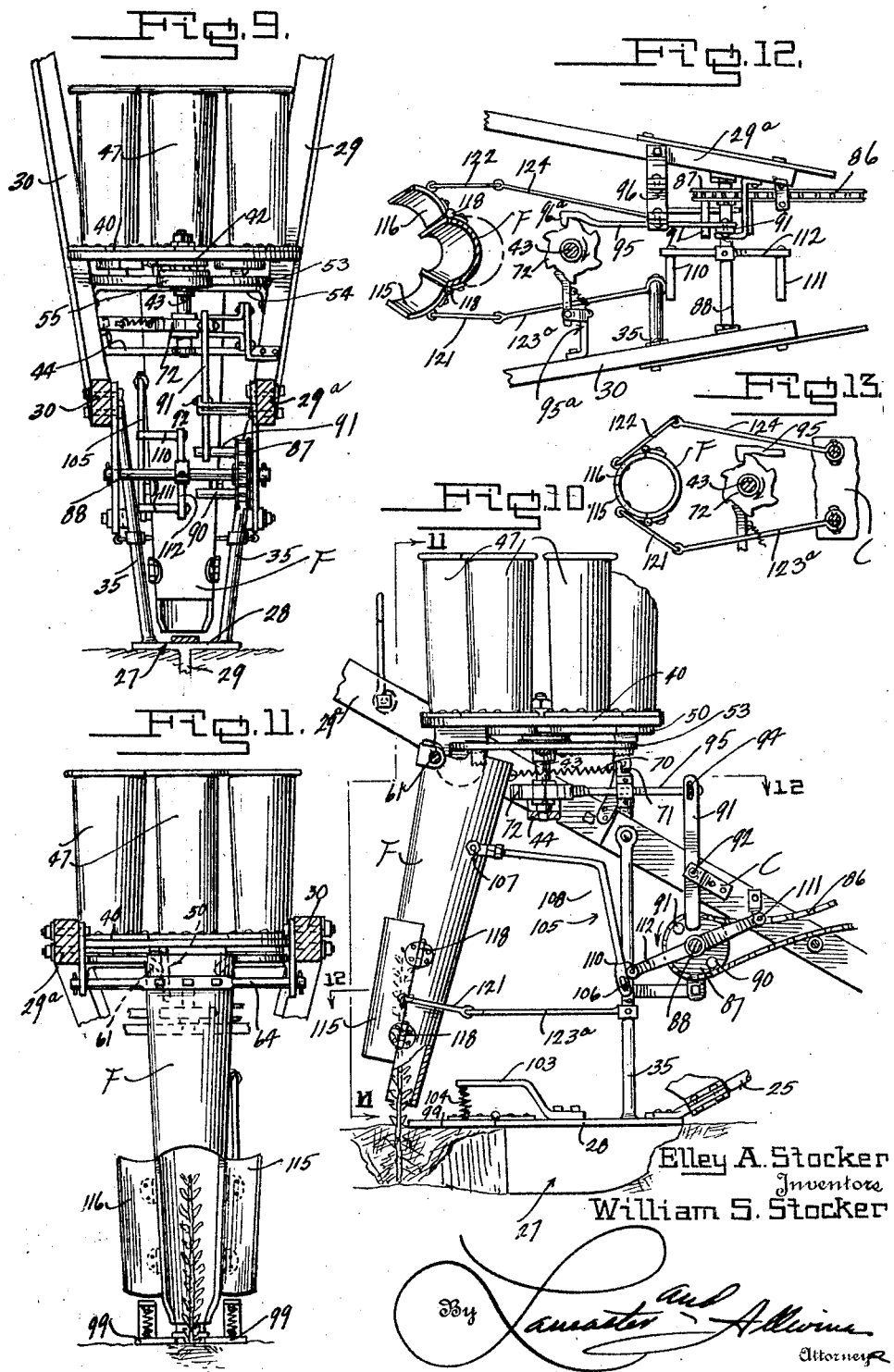

1,657,944

UNITED STATES PATENT OFFICE.

ELLEY A. STOCKER AND WILLIAM S. STOCKER, OF MILLION, KENTUCKY.

PLANT SETTER.

Application filed October 30, 1926. Serial No. 145,197.

This invention relates to improvements in plant setters.

The primary object of this invention is the provision of an improved plant setting machine which may be used to completely set plants quickly and with ease, in an efficient manner by means of opening the soil, depositing the plant roots in the soil, holding the plant steady, and placing the soil about the roots of the plant in a proper relation.

A further object of this invention is the provision of an improved plant setting machine, in part embodying means to water the plant as the same is being planted.

A further object of this invention is the provision of novel means for mechanically and quickly setting and planting a plurality of plants in rows.

A further object of this invention is the provision of an improved plant setter embodying novel means for setting the plants and the firm placement of the soil about the roots thereof.

Other objects and advantages of this invention will be apparent during the course of the following detailed description.

In the accompanying drawings, forming a part of this specification, and wherein similar reference characters designate corresponding parts throughout the several views, Figure 1 is a side elevation, partly in section, of the improved plant setter.

Figure 2 is a plan view of the improved plant setter showing certain details removed to better illustrate other details.

Figures 3 and 4 are sectional views taken substantially on their respective lines in Figure 1 of the drawings.

Figre 5 is a sectional view taken substantially on the l'ne 5—5 of Figure 3 of the drawings.

Figure 6 is a sectional view taken substantially on the line 6—6 of Figure 5.

Figure 7 is a fragmentary view, partly in section, showing details of the means to water the plants as they are being set.

Figure 8 is a view illustrating details for operating a water pump for watering the plants as they are being set.

Figure 9 is a sectional view taken substantially on the line 9—9 of Figure 1.

Figure 10 is a fragmentary side elevation of details of the improved plant setter, showing the posit'on of the details for the stabilizing of a plant during that period when the soil is being firmly pushed down about the roots of the plant.

Figure 11 is a sectional view taken substantially on the line 11—11 of Figure 10.

Figure 12 is a sectional view taken substantially on the line 12—12 of Figure 10.

Figure 13 is a fragmentary plan view showing certain operating details of the invention.

Figure 14 is a sectional view taken substantially on the line 14—14 of Figure 5.

Figure 15 is a perspective view of a cam ring on which the hinged closures for releasing the plants operate.

In the drawings, wherein for the purpose of illustration is shown only a preferred embodiment of this invention, the letter A may generally designate the improved plant setter which may consist of running gear B having a frame C mounted thereon to which a plow D is connected. Means E is provided for receiving and distributing a plurality of plants to a chute F which cooperates with the plow D in the setting of the plants. Means G is provided for watering the plants as they are being set.

Referring to the running gear B, the same preferably comprises a stationary supporting axle 20, upon the ends of which suitable spindles are provided for rotatably receiving running wheels 21 and 22, which may be provided with suitable cleats or projections 23 thereon of any nature desired, for supporting the plant setter upon hillsides, and in like places, against sliding movement.

Referring to the frame C, the same preferably comprises a main beam 25, diagonally sloping forward and downward, swivelly connected at 26 to the axle 20 intermediate the ends of the latter. At its forward end the beam 25 is rigidly connected to the plow blade 27, which is probably best illustrated in Figure 9 of the drawings, as being of T-shaped formation, including a top horizontal blade 28 and a furrow providing vertical blade 29 which penetrates the ground and provides the groove in which the plants are dropped, and as will be subsequently described.

The frame C furthermore includes spaced rearwardly diverging handles 29ª and 30, which converge forwardly and are connected to metal pieces 31 and 32 respectively, which are suitably connected at 34 to the main beam 25 intermediate the ends of the latter, as is well illustrated in Figures 1 and 2 of the drawings. These handles 29ª and 30 are in the nature of ordinary plow handles, and are provided for the purpose of lifting the plant setter off the ground when so desired, or on the numerous occasions when such will be necessary. Vertical braces 35 are mounted at their lower ends upon the plow blade 28, and at their upper ends being connected to the handles 29ª and 30, at 36. In this manner the handles 29ª and 30 are rigidly connected with the main beam 25 and with the plow blade 27, and as is obvious from the drawings.

Referring to the plant distributing means E, and the means for operating the same, the same includes a rotary plate 40, which is provided with a plurality of openings 41 therethrough. The said rotary plate 40 is in disc form, and supported upon an anti-friction bearing 42 mounted upon a suitable supporting plate 55, which may be carried by braces attached to the handles 29ª and 30, or held stationary by brace arms 52 attached to the cam ring or member 53, as illustrated in Figures 4 and 5 of the drawings. This disc or plate 40 is horizontally disposed upon the thrust bearing 42, and on the top surface thereof are a plurality of vertically positioned cups 47, arranged in an annular relation upon the disc, and the compartments 48 of which are opened upwardly and open downwardly to the openings 41.

For each of the plant receiving cups and openings 41 therefor, a trap door or lid 50 is provided, each of the same being hingedly connected at 51 radially upon the plate 40, and so that the said trap lids or doors may swing downwardly to expose the openings 41 for permitting the plants to drop downwardly through the openings 41 into the dispensing tube or chute F.

As to the control of the trap doors or lids or closures 50, a cam ring 53 is supported on the handles 29 and 30 by arms or brackets 54, in spaced relation and parallel below the plate 40. This cam ring 53 is segmental in form, having an opening 56 therein to accommodate the movable chute F. The cam 53 is supported below the closures 50, so that rub lugs on the bottoms of the closures 50 will rub on the top surface of the cam 53 during the rotation of the dispensing plate 40, but as said closure lids 50 move to the location of the cut away portion or recess 56, the free ends of said closure plates are released, permitting the said closure lids to drop by gravity to expose the plate openings 41 thereover, and permit the dropping of the plants thru the chute, as illustrated in Figure 1 of the drawings.

The rub lugs of the closures 50 travel on top of the ring 53 during their rotation, and are adapted to cooperate on a cam end 61 of the ring, which extends into the upper end of chute F to receive rub lugs thereagainst as the plate 40 is rotated, to close the trap lids 50 immediately after they have opened; this closing operation being effected in the upper end of the chute F, or immediately thereabove, after the plant has been dropped into the chute F, and the cam end 61 so closing the top lids that the rub lugs may then ride onto the cam ring 53 to hold the same closed during a complete rotation thereof, and during which time the operator may place the plants in the receptacles or cups 47 from the opposite sides of the plant setter device A, in any approved relation.

Referring to the suspension chute F, the same is in the form of the frustum of a cone, and of tubular formation, having a passageway 63 therethrough which is of larger diameter at the top of the tube chute and of smallest diameter at the bottom thereof. The said chute F is hingedly suspended from the handles 29ª and 30 by suitable means 64, as illustrated in Figures 1, 10 and 11 of the drawings, so that the chute F may swing from a vertical position rearwardly for a purpose which will be subsequently mentioned. The passageway 63 aligns with the cut away portion or opening 56 of the cam ring 53, and so that as the closures 50 move into the space directly above the passageway 63 they will be released from their closed position on the cam 53 and drop by gravity to open the cups 47, in turn, to the dispensing chute F, through the respective openings 41, so that the plants may drop into the chute and be deposited at the lower end thereof in the furrow formed by the plow D immediately rearwardly of the latter. Of course, the roots of the plants will be lowermost and will drop into the furrow.

The dispensing chute F is normally urged and maintained in a vertical position by means of a tension spring 70, connected at one end to the upper end of the chute F diametrically opposite from the hinged mounting of said chute; said spring at its opposite end being connected to a suitable connection 71 mounted on the top of one of the standards or uprights 35, as is illustrated in Figures 1 and 10 of the drawings.

Referring to the means for rotating the plant supporting disc or plate 40 in order to successively dispense the plants from the cups 47, it is to be noted that a ratchet wheel or toothed member 72 is mounted on the rotary spindle 43 to which the disc or plate 40 is keyed. The number of teeth on this wheel 72 is equal to the number of dispensing openings 41 in the plate 40.

Referring now to the means for operation upon the ratchet wheel 72, a shaft 75 is rotatably supported by brackets 76 and parallel with and preferably forward of the axle 20, one end of this shaft 75 preferably having a gear 77 rotatable thereon, which is in meshing relation with a gear 78 connected for rotation with the wheel 22. Inward of the rotary gear 77 on the shaft 75 is a clutch 79 which consists of a portion 80 rigid with the gear 77 and a clutch part 81 splined on the shaft 75; the latter being operated by means of a lever 82 pivoted at 83 intermediate its ends on the axle 20; this lever 82 being of the ordinary rack controlled type. At its end opposite the drive end, the shaft 75 is provided with a sprocket wheel 85 over which a chain 86 is trained; the chain 86 leading to a rear sprocket wheel 87 over which the chain is trained at its opposite end; the sprocket wheel 87 being mounted for rotation on a shaft 88 rotatably supported between the handles 29ª and 30, in the relation of parts illustrated in Figures 1 and 2 of the drawings. This sprocket wheel 87, as is probably best illustrated in Figure 10 of the drawings is provided with laterally extending pins 90 and 91 diametrically disposed at opposite sides of the shaft 88, which are adapted to kick against the lower movable end of a substantially vertically arranged lever 91 which is pivoted at 92 intermediate its ends on a handle 29ª of the frame C, or upon an analogous frame location. This lever 91 at its upper end is provided with a slot 94 in which a pin of a slidable connecting arm 95 is mounted; the slidable connection arm 95 being slidably mounted on a bracket 96 suitably supported upon the handle 29ª of the frame C, as illustrated in Figure 12 of the drawings; the arm 95 at its rear end having a hook 96ª adapted to engage against the teeth of ratchet wheel 72 to pull the same around for a distance of the length of a tooth on the ratchet wheel 72, at each time that the pins 90 or 91 contact against the lower end of the lever 91. In this manner the openings 41 of the rotary plate 40 are successively aligned with the dispensing chute to drop plants into the latter.

As to the reason for moving the chute F rearwardly at its lower end immediately at the time that the plant has entered the furrow from the chute, it should be remembered that the entire plant setter is moving forwardly, and after the plant roots have entered the furrow, the plant will have to be held stationary or supported, much in the same manner that a person would support a plant during the setting of the roots thereof in the ground, and until the soil is packed firmly about the roots of the plant. Means for packing the soil about the roots after the plant has been dropped into the furrow consists in the provision of spaced soil packing members 99 and 100, hingedly connected at 101 on the plow blade 28, at the rear end thereof, and at opposite sides of the furrow which has been formed. Suitable brackets 103 are mounted on the plow blades 28, supporting compression springs 104 which urge against the tops of the packer members 99 and 100 and urge the same downwardly for compressing the soil at opposite sides of the furrow, for the purpose of packing the same against the roots of the plants in the furrow. During this operation the chute F is made so as to swing rearwardly at its lower end to stabilize the plant during the root planting operation.

The means for moving the chute F consists in the provision of a substantially right angled lever member 105, slidably pivoted on a pin 106, at one end thereof; the pin 106 being mounted on the standard 35. At its opposite end the right angled lever member 105 is movably connected at 107 to the chute F below the hinged connection thereof. An arm portion 108 of the lever member 105 is in position to be engaged by the laterally extending fingers 110 and 111, shown on the outer ends of a diametrically disposed member 112 keyed on the shaft 88 for rotation therewith; the fingers 110 and 111 of course being disposed at diametrically opposed sides of the shaft 88 for engagement against the arm portion 108 during rotation of the shaft 88, to oscillate the chute F in synchronism with the dropping of the plants into the said chute, for the purpose of stabilizing the plants until the same have been firmly packed in the ground furrow, and the chute member F is swung forwardly at its lower end when the plant is released from the chute.

In order to permit the unobstructed release of the plant from the chute after the same has been preferably set and the roots packed, it is preferred to provide doors or hinged closures 115 and 116 at the lower end of the chute F, which really comprises the rear lower portion of the chute; said closures or doors being hinged at 118 at opposite sides of the chute, and the said doors being complementary with the portion of the chute to which they are hinged, so that when they are open they will expose the lower portion of the passageway 63 of the chute F, to permit the chute to ride away from the plant which has just been set and released from the chute F. The opening of these doors or closures 115 and 116 is of course timed to synchronize with the dropping of the plants and the setting thereof, and to this end the closures 115 and 116 are suitably connected by flexible connecting links 121 and 122 respectively with rigid rods 123 and 124 respectively which are supported in rigid rearwardly extending relation by any suitable portion of the frame, C, and more particularly on the lower ends of the vertical standards 35. It is readily apparent that due to these connections, upon forward swinging of the chute F, the doors 115 and 116 will be swung open to receive the plant after the same has been set. It is preferred that the hinges 118 which mount said doors are of the spring type of hinge, to automatically close the doors when the chute F is brought to its normal vertical position.

Means is provided for ejecting a quantity of water into the furrow at the roots of the plants as they are being set just prior to the compressing of the soil about the roots of the plants. This means contemplates the provision of a water container 120 mounted on the suitable frame 121 carried by the axle 20, thereabove. Referring to Figure 7 of the drawings a cylinder 123 is supported by a suitable bracket 124 on the frame shaft 25 immediately above the plow blade 27. The cylinder 123 at its lower forward end is provided with an opening 124ª which opens into a nozzle 125; a check valve 126 being provided in this nozzle 125 adjacent the opening 124, to permit the ejection of water from the cylinder compartment 128, but preventing any return flow of fluid into the cylinder from the nozzle 125.

The water container 120 is communicated with the cylinder compartment 128 by means of a preferably flexible hose 130, which leads from the lower portion of the container 120, as at 131, to the forward part of the cylinder 123. In the coupling at the cylinder 123 to which the hose 130 is connected, is provided a check valve 133 which permits the water to enter the cylinder compartment 128 but will prevent any back flow of the fluid into the hose 130.

A piston 135 operates in the cylinder compartment 128, and to it is connected a piston rod 136, which at the rear end thereof is swivelly connected at 137 to a connecting rod 138 which extends forwardly and upwardly and which at its upper end is slidably mounted in any approved manner on a suitable bracket 140 preferably carried by the stationary axle 20, and which bracket 140 is best illustrated in Figure 8 of the drawings. The slidable square end 141 of the shaft or connecting rod 138 prevents the rotation of the latter. As is illustrated in Figure 7 a tension spring 145 normally urges the piston 135 forwardly into the cylinder compartment 128 for the purpose of ejecting a supply of liquid which has entered the cylinder; this spring 145 at one end being connected at 147 to the cylinder and at its opposite end 148 to a bracket which is carried by the slidable connecting shaft or rod 138. On the squared end 141 at the forward end of said connecting rod 138 is provided a laterally extending finger 150, which is in the path to be engaged by laterally extending fingers 152 and 153 which are mounted upon a disc 154; the said disc 154 being mounted on the driven shaft 75 above mentioned, and the pins 152 and 153 being disposed diametrically at opposed sides of the shaft 75, as illustrated in Figure 8, and intended to engage against the pin 150 and force the shaft forwardly for the purpose of moving the piston 135 to open the cylinder 128 and draw in a supply of water from the water container 120, as is perfectly apparent.

From the foregoing description of this invention it is apparent that a novel plant setter has been provided, which will regularly and mechanically feed plants from a distributor into a dispensing chute, where the same will be efficiently dropped into a prepared furrow and immediately watered and firmly packed at the roots thereof, in the soil. The various operations of the machine are synchronous.

The improved machine may be propelled by manual, draft animal, or motive power. In the preferred instance the same will be provided with suitable draft gear K connected with the stationary axle 20, to which a single horse or draft animal may be hitched, although such draft gear K may be dispensed with and other means provided for propelling the improved plant setter A, as will be readily apparent to anyone skilled in the art. The plants may be fed into the machine by a person walking along the side thereof, who deposits them into the cups 47, and the machine may be hand regulated at its rear end to control the travel thereof over the ground according to the nature of the soil encountered and the quality thereof.

Various changes in the shape, size, and arrangement of parts may be made to the form of invention herein shown and described, without departing from the spirit of the same or the scope of the claims.

We claim:

1. In a plant setting machine the combination of a supporting frame, running gear for the supporting frame, means for supporting and dispensing plants from the frame, a guide chute, means hingedly connecting the guide chute so that the plants are received as they are dispensed by the above mentioned means, means carried by the frame for providing an opening in the earth into which the guide chute guides the plants, roots foremost, means operable by the running gear for moving the chute at its lower end rearwardly as the frame moves forwardly to steady the plant after it has been placed in the earth opening, and means for packing the earth in the opening about the roots of the plant as the plant is being so steadied.

2. In a plant setting machine the combination of a supporting frame, running gear for the supporting frame, means for supporting and dispensing plants from the frame, a guide chute, means hingedly connecting the guide chute so that the plants are received as they are dispensed by the above mentioned means, means carried by the frame for providing an opening in the earth into which the guide chute guides the plants, roots foremost, means operable by the running gear for moving the chute at its lower end rearwardly as the frame moves forwardly to steady the plant after it has been placed in the earth opening, means for packing the earth in the opening about the roots of the plant as the plant is being so steadied, said chute having doors thereon at the lower end thereof and at the rear side thereof, and means carried by the frame for operating said doors after the plant has been planted and the steadying operation of said chute is at an end.

3. In a plant setter the combination of a supporting frame, running gear for the supporting frame, means for supporting and dispensing plants from the supporting frame, means carried by the supporting frame for providing an opening in the earth, a guide chute hingedly carried by said frame into which the plants are dispensed, roots foremost into the opening provided in the earth, means connected with the running gear for moving said hinged chute to steady the plant immediately after it has been placed in the earth opening and while the frame is in a continued movement away from said plant, means for compressing the earth about the roots of the plant which is being so steadied during the period which it is steadied, and means for ejecting a quantity of water into the earth about the roots of the plant.

ELLEY A. STOCKER.
WILLIAM S. STOCKER.